United States Patent
Garcia-Martinez

(10) Patent No.: US 10,380,606 B2
(45) Date of Patent: Aug. 13, 2019

(54) NEGATIVE SIGNALS FOR ADVERTISEMENT TARGETING

(75) Inventor: Antonio Felipe Garcia-Martinez, Alameda, CA (US)

(73) Assignee: Facebook, Inc., Menlo Park, CA (US)

( * ) Notice: Subject to any disclaimer, the term of this patent is extended or adjusted under 35 U.S.C. 154(b) by 417 days.

(21) Appl. No.: 13/566,016

(22) Filed: Aug. 3, 2012

(65) Prior Publication Data

US 2014/0040010 A1 Feb. 6, 2014

(51) Int. Cl.
G06Q 30/02 (2012.01)
G06Q 50/00 (2012.01)

(52) U.S. Cl.
CPC ......... *G06Q 30/02* (2013.01); *G06Q 30/0269* (2013.01); *G06Q 50/01* (2013.01)

(58) Field of Classification Search
USPC ......... 705/14.1–14.73, 319, 7.29, 7.32, 7.36; 379/265.09; 704/9, 8; 709/204, 206, 224
See application file for complete search history.

(56) References Cited

U.S. PATENT DOCUMENTS

| | | | |
|---|---|---|---|
| 6,185,558 B1 | 2/2001 | Bowman et al. | |
| 7,499,913 B2 | 3/2009 | Kraft et al. | |
| 7,925,743 B2 | 4/2011 | Neely et al. | |
| 8,135,617 B1 | 3/2012 | Agostino et al. | |
| 2004/0107088 A1 | 6/2004 | Budzinski | |
| 2004/0267723 A1 | 12/2004 | Bharat | |
| 2007/0288461 A1 | 12/2007 | Burrows et al. | |
| 2008/0059421 A1 | 3/2008 | Baartman et al. | |
| 2008/0065655 A1 | 3/2008 | Chakravarthy et al. | |
| 2008/0077494 A1 | 3/2008 | Ozveren et al. | |
| 2008/0263038 A1 | 10/2008 | Judge et al. | |
| 2009/0125505 A1 | 5/2009 | Bhalotia et al. | |
| 2009/0125872 A1 | 5/2009 | Kannan et al. | |
| 2010/0030648 A1* | 2/2010 | Manolescu et al. | 705/14.66 |

(Continued)

FOREIGN PATENT DOCUMENTS

| | | |
|---|---|---|
| JP | 2009-99088 A | 5/2009 |
| JP | 2011-248831 A | 12/2011 |

(Continued)

OTHER PUBLICATIONS

Gupta, M., et al., "An Overview of Social Tagging and Applications," Mar. 2011, pp. 1-55, can be retrieved at <http://www.cs.illinois.edu/homes/gupta58/pub/gupta11_snda.pdf>.

(Continued)

*Primary Examiner* — Patricia H Munson
(74) *Attorney, Agent, or Firm* — Fenwick & West LLP

(57) ABSTRACT

Users of a social networking system perform actions on various objects maintained by the social networking system. Some of these actions may indicate that the user has a negative sentiment for an object. To make use of this negative sentiment when providing content to the user, when the social networking system determines a user performs an action on an object, the social networking system identifies topics associated with the object and associates the negative sentiment with one or more of the topics. This association between one or more topics and negative sentiment may be used to decrease the likelihood that the social networking system presents content associated with a topic that is associated with a negative sentiment of the user.

22 Claims, 2 Drawing Sheets

(56) References Cited

U.S. PATENT DOCUMENTS

| | | | |
|---|---|---|---|
| 2010/0057725 A1 | 3/2010 | Matsumura | |
| 2010/0071000 A1* | 3/2010 | Amento et al. | 725/39 |
| 2010/0114887 A1 | 5/2010 | Conway et al. | |
| 2010/0145678 A1 | 6/2010 | Csomai et al. | |
| 2010/0169441 A1 | 7/2010 | Lafleur et al. | |
| 2010/0174726 A1* | 7/2010 | Nance et al. | 707/750 |
| 2011/0055017 A1 | 3/2011 | Solomon et al. | |
| 2011/0060649 A1 | 3/2011 | Dunk et al. | |
| 2011/0106630 A1* | 5/2011 | Hegeman et al. | 705/14.71 |
| 2011/0153412 A1 | 6/2011 | Novikov et al. | |
| 2011/0196855 A1 | 8/2011 | Wable et al. | |
| 2011/0295612 A1* | 12/2011 | Donneau-Golencer et al. | 705/1.1 |
| 2012/0047219 A1 | 2/2012 | Feng et al. | |
| 2012/0331049 A1 | 12/2012 | Deeter et al. | |
| 2012/0331064 A1 | 12/2012 | Deeter et al. | |

FOREIGN PATENT DOCUMENTS

| | | | |
|---|---|---|---|
| JP | 2013-516002 A | 5/2013 | |
| KR | 10-2006-0051986 A | 5/2006 | |
| KR | 10-2010-0035921 A | 4/2010 | |

OTHER PUBLICATIONS

Patent Cooperation Treaty, International Search Report and Written Opinion, International Patent Application No. PCT/US2012/041105, dated Aug. 1, 2012, 6 pages.

PCT International Search Report and Written Opinion, PCT Application No. PCT/US2013/051702, dated Nov. 6, 2013, fourteen pages.

Australian Government, IP Australia, Patent Examination Report No. 1, Australian Patent Application No. 2012273407, dated Aug. 16, 2016, three pages.

Canadian Intellectual Property Office, Office Action, Canadian Patent Application No. 2,840,285, dated Sep. 23, 2015, four pages.

Canadian Intellectual Property Office, Office Action, Canadian Patent Application No. 2,840,285, dated Jan. 8, 2016, three pages.

Canadian Intellectual Property Office, Office Action, Canadian Patent Application No. 2,840,285, dated Feb. 18, 2016, four pages.

Canadian Intellectual Property Office Office Action, Canadian Patent Application No. 2,840,285, dated Jun. 2, 2016, three pages.

Canadian Intellectual Property Office, Office Action, Canadian Patent Application No. 2,879,830, dated Nov. 1, 2016, two pages.

Japan Patent Office, Office Action, Japanese Patent Application No. 2015-525457, dated Apr. 18, 2017, four pages.

Australian Government, IP Australia, Examination report No. 1 for standard patent application, Australian Patent Application No. 2013296857, dated Feb. 7, 2018, four pages.

Canadian Intellectual Property Office, Office Action, Canadian Patent Application No. 2,879,830, dated Nov. 28, 2017, six pages.

Korea Intellectual Property Office, Office Action, Korean Patent Application No. 10-2015-7004801, dated Nov. 28, 2017, eleven pages.

Korea Intellectual Property Office, Office Action, Korean Patent Application No. 10-2014-7001798, dated Dec. 7, 2017, five pages.

Australian Government, IP Australian, Examination report No. 2 for standard patent application, Australian Patent Application No. 2013296857, dated Jun. 26, 2018, four pages.

* cited by examiner

NEGATIVE SIGNALS FOR ADVERTISEMENT TARGETING

BACKGROUND

The present disclosure relates generally to social networking systems, and more particularly to modifying distribution of content to social networking system users based on inferred negative sentiments for the users.

Users of a social networking system may form connections, associations, or other relationships with other users based on real-life interactions, online interactions, or a mixture of both. Content posted by a user may be made available to the user's connections via one or more of various communication channels in the social networking system, such as a newsfeed or stream. However, users of the social networking system often receive content that is of no interest to the users. To improve the content provided to users, including advertising, it would be desirable to have a system for inferring topics and other information that users dislike in addition to the users' interests.

SUMMARY

To enhance user experience, a social networking system infers a user's negative sentiment about topics related to content in the social networking system based on negative sentiment towards the topics by the other users in the in the social networking system, such as other users connected to the user. Using the inferred sentiment, the system selects, filters, predicts, or otherwise modifies content subsequently delivered to the user based on the inferred negative sentiment of the user. For example, the social networking system maintains one or more pages including content about a particular topic, where it is known that certain interactions with the pages indicate a negative sentiment for the associated topic. In one embodiment, the social networking system associates certain types of user actions performed in connection with a page with negative sentiment for a topic associated with the page. As users of the social networking system interact with the page, the social networking system infers that those users have a negative sentiment for the topic associated with the page. The users may also interact with another page in the social networking system (or outside of the social networking system) that is also associated with the same topic, but where the sentiment for the topic (e.g., positive or negative) associated with the other page is unknown. However, since those users' sentiments for the topic have been inferred, the system infers that the interactions with the other page also indicate a negative sentiment for the topic. The system can then infer that other users who interact with the other page also have the negative sentiment for that same topic. This inferred negative sentiment may then be used to generate negative interest profiles that include negative topics for the users. A user's negative interest profile may be used to perform content filtering, ad targeting, click prediction or otherwise modify presentation of content to the user.

For example, the social networking system may maintain a page titled "I hate hockey," wherein the keyword "hate" in the title indicates a negative sentiment towards a topic ("hockey" in this example). A set of social networking system users may like the "I hate hockey" page, so the social networking system associates a negative sentiment for the topic of "hockey" with the set of users liking the "I hate hockey" page. If a number of the social networking system users liking the "I hate hockey" page also like another page in the social networking system titled "Hockey?," the social networking system may infer a negative sentiment for the topic of "hockey" for users that like the "Hockey?" page. Hence, a user for which the social networking system does not identify a sentiment for the topic of "hockey" may like the "Hockey?" page, and the social networking system infers that the user has a negative sentiment for the topic of "hockey" based on the other users' interactions with the "I hate hockey" and "Hockey?" pages. Accordingly, the social networking system may add the topic of "hockey" to the user's negative profile, which may be used to subsequently filter content related to "hockey" from presentation to the user.

As mentioned above, to improve content distribution, the social networking system may maintain a negative profile for a user that includes topics associated with a negative sentiment. For example, the negative profile may be included in or associated with a user profile of the user. The negative profile may be used to prevent pages, or other content, associated with topics identified by the blacklist from being presented to the user. This reduces the likelihood of a user being presented content that the user has little interest in viewing.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
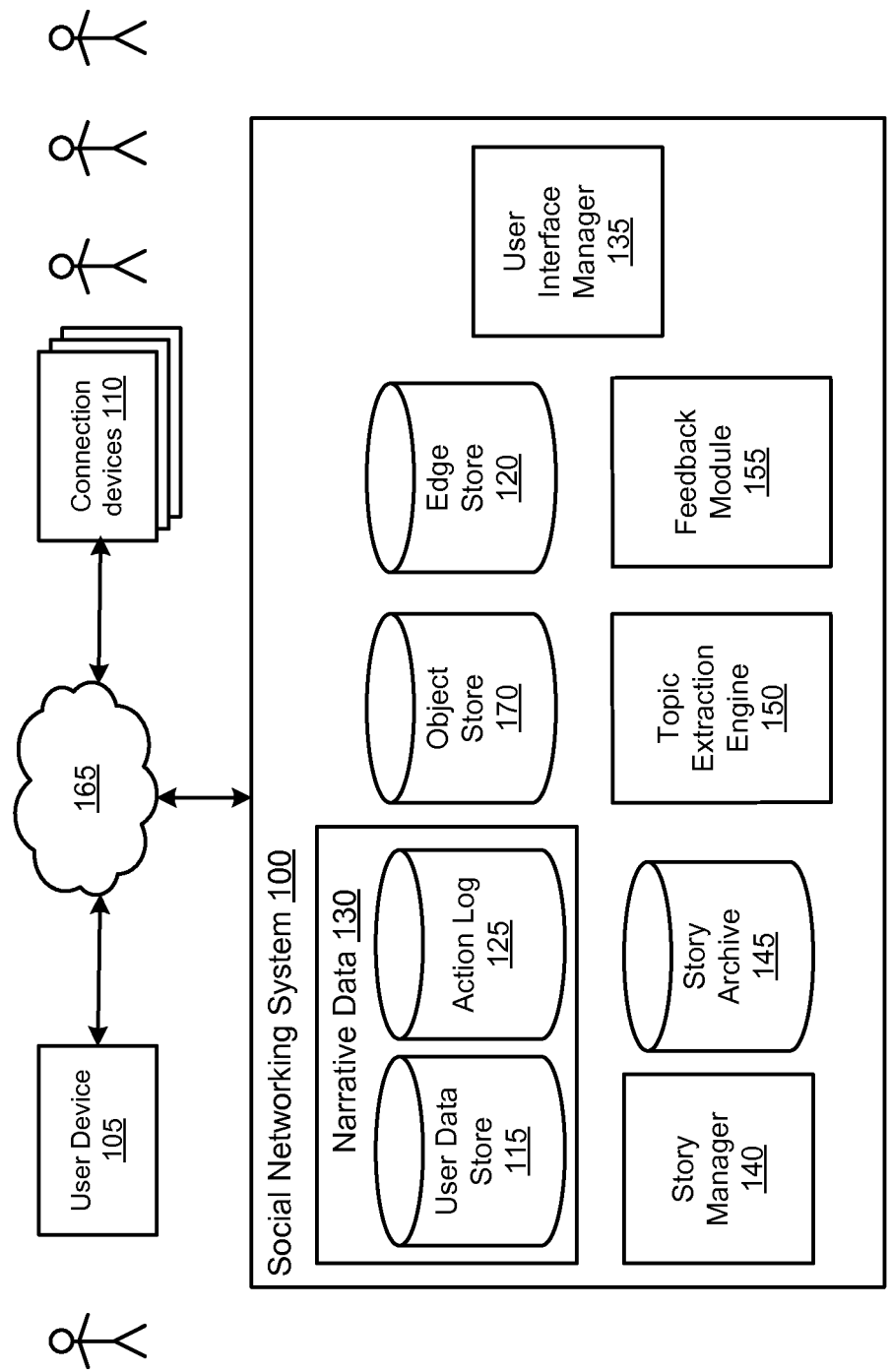
FIG. 1 illustrates a high-level block diagram of system environment for modifying content provided to social networking system users based on the users' negative sentiments towards content items, in accordance with one embodiment.

FIG. 1 illustrates a diagram of a system environment for modifying content presented to social networking system users based on negative sentiment of the users for content items in the social networking system 100. A user's negative sentiment for a content item indicates a lack of interest by the user in a topic associated with the content item. The negative sentiment of a user for a topic of a content item interacted with by the user may be inferred from interactions by other users of the social networking system 100 with other content items having the same topic as the content item interacted with by the user. The social networking system 100 may infer a negative sentiment towards a topic when other social networking system users have performed similar interactions with other content items associated with the same topic. Based on the negative sentiment for one or more topics, the social networking system 100 may select content items for the user so that the user is not presented with content items associated with a topic for which the user has a negative sentiment. Content items may include any type of media content, such as advertisements, coupons, status updates, pages maintained the social networking system 100 or other textual messages, location information (e.g., location based push information), photos, videos, and links, etc. The social networking system 100 may also recommend other users of the social networking system 100 for connecting to a particular user (i.e., become friends) based on the negative sentiment for one or more topics that are common amongst the users.

Generally, the social networking system 100 offers its users the ability to communicate and interact with other social networking system users. As used herein, a "user" may be an individual or entity (such as a business or a third party application). Also, as used herein, a "connection" identifies a user of the social networking system 100 to which another user may form, or has formed, an association or other relationship. Users join the social networking system 100 and then connect with other users, individuals, and entities to which they desire to be connected. A user may explicitly add a connection, for example, the user selects a particular other user to be a friend of the user. Alternatively, a connection between the user and another user may be automatically created by the social networking system based on common characteristics of the users (e.g., users who are alumni of the same educational institution). Connections in social networking systems may be in both directions or may be in just one direction. For example, if Bob and Joe are both users and connect with each another, Bob and Joe are each connections of the other. If, on the other hand, if Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends).

In addition to interactions with other users, the social networking system 100 provides users with the ability to take actions on various types of objects supported by the service. These objects may include groups or networks of users to which users of the social networking system may belong, events or calendar entries in which a user might be interested, computer-based applications that a user may use via the service, transactions that allow users to buy or sell items via the service, and interactions with advertisements that a user may perform on or off the social networking system. These are just a few examples of the objects upon which a user may act on a social networking system 100, and many others are possible. Though many of the embodiments and examples provided herein are directed to particular embodiments of a social networking system 100, other embodiments may include other environments involving different types of social networks, social content, and other types of websites and communication mechanisms.

User generated content enhances the user experience on the social networking system. Content items may include any type of media content, such as status updates or other textual messages, location information, photos, videos, advertisements, and links as previously mentioned above. Content items are pieces of content that are represented as objects in the social networking system 100. In this way, users of a social networking system are encouraged to communicate with each other by "posting" content items of various types of media through various communication channels to the social networking system. Using communication channels, users of a social networking system 100 increase their interaction with each other and engage with the social networking system on a more frequent basis. One type of communication channel is a "stream" in which a user is presented with a series of content items that are posted, uploaded, or otherwise provided to the social networking system from one or more users of the service. The stream may be updated as users add content items to the stream. Example communication channels for a social networking system are discussed further in U.S. application Ser. No. 12/253,149, filed Oct. 16, 2008, which is hereby incorporated by reference in its entirety.

Users interact with the social networking system 100 using client devices, which are shown in FIG. 1 as a user device 105 and connection devices 110. The user device 105 and/or connection devices 110 are for interacting with the social networking system 100 and may be any computing device having data processing and data communication capabilities. Examples of client devices include a personal computer (PC), a desktop computer, a laptop computer, a notebook, tablet PC, a personal digital assistant (PDA), mobile telephone, smartphone, or internet tablet. These devices may include a camera sensor that allows image and video content to be captured and uploaded to the social networking system 100. These devices may also have a touch screen, gesture recognition system, mouse pad, or other technology that allows a user to interact with the social networking system 100 through a user interface provided by the social networking system 100.

The interactions between the user device 105, connection devices 110 and the social networking system 100 are typically performed via a network 165, for example, via the internet. The network 165 enables communications between the user device 105, connection devices 110, and the social networking system 100. In one embodiment, the network 165 uses standard communications technologies and/or protocols. Thus, the network 165 may include links using technologies such as Ethernet, 802.11, worldwide interoperability for microwave access (WiMAX), 3G, 4G, LTE, digital subscriber line (DSL), asynchronous transfer mode (ATM), InfiniBand, PCI Express Advanced Switching, etc.

In one embodiment, the client device 105 executes a user interface or application to allow a user to interact with the social networking system 100. The user interface allows the user to perform various actions or activities associated with the social networking system 100 and to view information provided by the social networking system 100. Example actions performed using the user interface include adding connections, posting messages, posting links, uploading images or videos, updating the user's profile settings, viewing stories, and the like. Examples of information provided by the social networking system 100 that can be viewed using the user interface includes: images or videos posted by the user's connections, comments posted by the user's connections, messages sent to the user by other users, wall posts, etc.

In one embodiment, when a user "A" views the data of another user "B," user "A" is called the "viewing user," and the user "B" is called the "subject user." The user interface allows a viewing user to view the data of other subject users of the social networking system 100 as well as general data related to news, sports, interests, etc. Information in the user interface may be presented to viewing users in different views. For example, the social data of subject users can be presented to viewing users by way of a "profile page," which is an arrangement of the subject users' social networking data. The information about subject users may also be presented in the form of a news feed including stories describing actions performed by various subject users. In one embodiment the different views are represented using data and code in a web standard format presented through a browser. For example, a news feed may comprise a combination of any of XML, HTML, CSS, JavaScript, plaintext and Java sent from a server to a web browser running on a client, such as a user device 105. In another embodiment a news feed may comprise data formatted for presentation through a mobile app or desktop application.

A social network story (or "story") is an aggregation of data gathered by the social networking system 100 that is configured for display in various social networking system views (user interface views). For example, stories may be presented to viewing users in a continuously updated real-time newsfeed in a web browser, in a timeline view, or on a user's profile page. A story aggregation is a collection of one or more stories gathered together for display. For example, all the stories related to a particular event, such as a birthday party, may be aggregated into one story aggregation.

When a user joins the social networking system 100 the user creates a user account, which enables the user to maintain a persistent and secure identity on the social networking system 100. The user account may include a user profile that stores details or characteristics about the user. Examples of details or characteristics stored in the user profile include name, age, sex, interests, location, education history, employment information, relationship status etc. The social networking system 100 may provide a user with stream of data to keep the user updated on the activities of the user's connections, as well as to inform the user about news and information related to the user's interests. This stream of data may include stories, which are collections of related data presented together to the user, and story aggregations, which are collections of stories presented to the user.

The social networking system 100 maintains different types of data objects, for example, user data objects, action objects, and edge objects. A user data store 115 comprises user data objects. In one embodiment, a user data object comprises user profile information related to a user of the social networking system 100. For example, a user data object may store characteristics of the user such as a user's date of birth, interests, education information, employment information, a photo of the user, a reference to a photo of the user or other suitable information about the user.

An edge store 120 stores edge objects. In one embodiment the edge store 120 stores edges that describe relationships and/or associations between users other users, users and objects stored in the object store 170 and/or objects and objects on the social networking system 100 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system. The edge store 120 stores edge objects that include information about the edge, such as affinity scores for objects, interests, and other users as will be further described below.

The action log 125 includes actions performed by users of the social networking system 100 with respect to content items, or objects, stored in the object store 170 or with respect to other users. In one embodiment, an action comprises information related to interactions performed by users with respect to content items which have been logged in order to enhance the users' experience in the social networking system 100. Almost any activity of a user that is directed towards a content item can be stored as an action in the action log 125. For example, an interaction may be the posting of a new comment or status update, dismissing content items such as an advertisement or post, or it can be something as simple as forming an edge to another user. Additionally, an inaction or a lack of action with respect to a content item may be logged in the action log 125. For example, if a user does not respond to a post or a message in the social networking system 100, the inaction may be logged in the action log 125. In one embodiment, each action is assigned a unique action identifier (ID) and is stored with a user identifier (ID) associated with the user that performed the action with respect to content item corresponding to the action. The user data included in the user data store 115 and the actions included in the action log 125 are collectively referred to as narrative data 130.

The social networking system 100 maintains a social graph that tracks the relationship between the various objects, users, and events captured by the social networking system 100. In the social graph the users, the user data and other entities exist as nodes are connected to each other via edges. In this embodiment, the edges represent actions that create a relationship between the nodes. For example, a node representing a photograph stored in the social networking system 100 may have an edge to a user that uploaded the photograph, and this edge may be an "uploaded by" action. The same photograph may have edges to several other nodes that represent the users in that photograph, and these edges may be "tagged in" actions. Similarly, a node representing a user in the social networking system 100 may have edges to each node representing posts made by that user. These edges may all be "posted by" actions. The edges in the social graph can have different types that correspond to the different types of actions taken by users of the social networking system 100.

The social networking system 100 may maintain or compute a measure of a user's "affinity" for other users (or objects) in the social networking system 100. The measure of affinity may be expressed as an affinity score, which may represent that user's closeness to another user (or object) of the social networking system 100. The affinity score of a user X for another user Y can be used to predict, for example, if user X would be interested in viewing or would be likely to view a photo of user Y. The affinity scores can be computed by the social networking system 100 through automated methods, including through predictor functions, machine-learned algorithms, or any other suitable algorithm for determining user affinities. The social networking system 100 may store an archive of historical affinity scores for a user as their affinity scores for various users and objects changes over time. Systems and methods for computing user affinities for other users of a social networking system 100, as well as for other objects in the social networking system 100 are disclosed in U.S. application Ser. No. 12/978,265, filed on Dec. 23, 2010, which is hereby incorporated by reference in its entirety.

The social networking system 100 also includes a user interface manager 135. The user interface manager 135 provides server-side functionality allowing users of the social networking system 100 to interact with the social networking system 100 using the user interface. When users request information from the social networking system 100, the user interface manager 135 dispatches the requested information to users in a format that can be displayed through a client device, such as a user device 105 or a connection device 110. For example, when a user requests a news feed from the social networking system 100, the user interface manager 135 may send stories and story aggregations to a user device 105 and/or connection devices 110 that are configured to be displayed on the devices. Depending on the type of information requested by a user, the user interface manager 135 may send stories, story aggregations, profile pages, timelines, or other data to a client device.

The story manager 140 manages the story generation process. The story manager 140 comprises story generators configured to generate stories for different purposes (i.e., different views), which are stored in the story archive 145. Story generators are configured to generate stories for a particular target view, and may restrict the selection of narrative data used in story generation based on the target view. For example, a story generator may be configured to generate stories for a photo album view, and restrict the narrative data used for story generation to narrative data including or referencing images. Stories generated to be displayed in a user interface may contain different data than stories generated to be displayed in a desktop computer interface, and they may be visually formatted in a different way in order to optimize for the differences between a desktop computer display and tactile display (e.g. larger icons for a smaller smartphone screen). The social networking system 100 may also restrict the stories that are provided to a viewing user to stories including data related to the connections of the viewing user, i.e., to stories containing data about subject users that are connected to the viewing user in the social networking system 100.

In one embodiment, the story manager 140 generates a newsfeed, which comprises a scrollable list of the most relevant recent stories that may be of interest to a viewing user. The viewing user's interest in a story may be determined by the story manager 140 based on affinity or other factors. The story manager 140 may generate a timeline, which is a chronological list of stories related to a particular subject user that are ordered by time period. In some embodiments, a timeline may alter the ranking of some stories depending on other factors such as social importance or likely engagement value. Stories that are configured for display in a timeline are called timeline units. A timeline may also include special "report" units, which include multiple timeline units that have been aggregated together. For example, a user may have several wall posts from friends during the month of November. That user's timeline may then include a report unit containing all posts from friends during that month. For newsfeeds and timelines there may be multiple story generators producing stories of different types that are displayed together. Systems and methods for generating stories for a newsfeed from data captured by a social networking system are disclosed in U.S. application Ser. No. 11/503,037, filed on Aug. 11, 2006, and U.S. application Ser. No. 11/502,757, filed on Aug. 11, 2006, which are hereby incorporated by reference in their entirety. Timelines and timeline units are discussed in more detail in utility application U.S. application Ser. No. 13/239,347, filed on Sep. 21, 2011, which is also hereby incorporated by reference in its entirety.

In one embodiment, the topic extraction engine 150 identifies topics associated with content items stored in the object store 170. For example, the topic extraction engine 150 determines one or more topics associated with a content item with which a viewing user interacted. As another example, the topic extraction engine 150 may determine one or more topics associated with various content items stored by the social networking system 100 in the object store 170. In one embodiment, the topic extraction engine 150 identifies topics of content items associated with action stored in the action log 125. To identify topics associated with content items, the topic extraction engine 150 may identify anchor terms described in the content items (e.g., in posts of the user) associated with the action and determines the meaning of the terms as further described in U.S. application Ser. No. 13/167,701, filed Jun. 24, 2011, which is hereby incorporated by reference in its entirety. For example, if an action is associated with a post or a page that contains the text "Go Sharks!", the topic extraction engine 150 may identify candidate topics by comparing the text to entries in a dictionary or other stored data including entries associated with the term "sharks" such as: "Shark (animal)," "San Jose Sharks (hockey team)," "Jumping the Shark," and "Loan Shark." The identified candidate topics represent potential meanings for an identified anchor term.

In one embodiment, the topic extraction engine 150 eliminates candidate topics determined to be irrelevant to the anchor term. For example, the topic extraction engine 150 identifies and analyzes additional terms in a content item, such as a post, in view of various identified candidate topics. The topic extraction engine 150 may use a category tree to determine a measure of similarity or relatedness between candidate topics and identified terms in the content item associated with the action. The topic extraction engine 150 may eliminate one or more candidate topics based on the measure of similarity or relatedness received from the category tree.

The topic extraction engine 150 selects a candidate topic from among the relevant candidate topics as most likely to represent the meaning of the anchor term. In one embodiment, the topic extraction engine 150 generates a score for each candidate topic that is based on context words for the anchor term of the content item associated with the action, based on declared interests of a user associated with the action, based on a global context of the action, and based on a social context associated with the action. The topic extraction engine 150 then selects a candidate topic representing the topic for the anchor term based on the generated scores. The selected topic is associated with the action corresponding to the content item. The topic extraction engine 150 may also infer topics from posted videos or pictures which are represented as actions in the action log 125. The topic extraction engine 150 may identify a topic associated with video/pictures based on associated textual metadata that describes the content of the video/pictures.

In one embodiment, the feedback module 155 identifies negative sentiments of users towards topics of content items based on interactions between the users and the content items. Based on the identified negative sentiments, the feedback module 155 creates a negative profile for each user including negative topics about which the user has a negative sentiment. The feedback module 155 may use the negative profile associated with a user to determine content to provide to the user. In one embodiment, a negative profile for a user functions as a blacklist identifying topics not to be presented to a user. For example, the feedback module 155 may identify content such as advertisements, posts, images, video, newsfeeds or other content items that are associated with a topic included on a user's negative profile and prevent presentation of the identified content items to the user. This allows the feedback module 155 to use a user's negative sentiment for topics to limit presentation of content items associated with those topics to the user.

A user may interact with a content item, but it is unclear whether the user's interaction indicates a negative sentiment towards a topic associated with the content item. To identify a user's negative sentiment for a topic associated with a content item with which a user interacts, the feedback module 155 may infer negative sentiment towards the topic if other social networking system users having a negative sentiment for the topic performed similar interactions with the content item. For example, if social networking system users like or share a page expressing a negative sentiment for a topic and also like or share an additional page associated with the same topic, the social networking system may infer that other users liking or sharing the additional page also have a negative sentiment for the topic. In one embodiment, the other social networking system users from which the negative sentiment is inferred include users connected to the user in the social networking system 100.

For example, if the user interacts with a page "Hockey?" it is unclear whether the user has a negative sentiment towards the topic of "hockey." However, if social networking system users interacting with a page "I hate hockey," which indicates a negative sentiment for the topic "hockey," and also interact with the "Hockey?" page, the social networking system infers that users interacting with the "Hockey?" page have a negative sentiment towards hockey. Hence, the user's interaction with the "Hockey?" page is used by the social networking system 100 to infer that the user has a negative sentiment for the topic "hockey."

To determine whether a user's interaction with a content item infers that the user has a negative sentiment for a topic associated with the content item, the feedback module 115 analyzes interactions with the content item by other social networking system users having a negative sentiment for the topic. If the other social networking system users having a negative sentiment for the topic performed similar interactions with the content item, the feedback module 115 infers that the user has a negative sentiment for the topic based on the user's interaction with the content item. In one embodiment, the feedback module 115 identifies from the action log 125 interactions by other users with one or more content items that clearly indicate a negative sentiment towards the a topic. For example, other users liking a page associated with the topic that include keywords (e.g., dislike, hate, sucks, etc.) indicative of negative sentiment and also liking a content item associated with the same is used by the feedback module 115 to infer that a user liking the content item has a negative interest in the topic.

In one embodiment, the feedback module 115 identifies whether a threshold number of the other users having a negative sentiment towards a topic have interacted with a content item, and infers a negative sentiment from interaction with the content item if at least a threshold number of users having the negative sentiment towards the topic have interacted with the content item. Hence, if at least the threshold number of users having negative sentiment towards the topic of the content item, a user's interaction with the content item infers that the user also has a negative sentiment towards the topic. The feedback module 115 may add the topic to the user's negative profile if a negative sentiment is inferred. In one embodiment, the number of users that have the negative sentiment towards a topic may be used to determine a weighting factor for a user's negative sentiment towards the topic. For example, the weighting factor is proportional to the number of users having negative sentiment towards the topic relative to the threshold number of users. If the threshold number of users has a negative sentiment towards the topic, a weight of "1" may be applied to the negative sentiment of the user for the topic. However, if only half of the threshold number of users have the negative sentiment towards the topic, a weight of "0.5" may be applied to the negative sentiment of the user for the topic. Thus, a sliding scale may be applied to a negative sentiment of a user towards a topic.

In an alternative embodiment, to identify a user's negative sentiment for a topic associated with a content item, the feedback module 155 identifies actions in the action log 125 identifying actions performed by the user on the content item. The feedback module 155 determines whether actions performed by the user are actions indicating a negative sentiment. For example, the feedback module 155 includes data identifying types of actions associated with a negative sentiment and determines whether actions performed by the user have the same type identified by the stored data. Certain actions performed by a user on a content item in the social networking system 100 may indicate a general negative sentiment towards the topic or topics corresponding to the content item. For example, a user closing (i.e., dismissing) a content item such as an advertisement, a post, a video, a news feed, a timeline, a story, etc. within a threshold amount of time from being displayed the content item (e.g., 1 second) indicates that the user has a negative sentiment associated with the topics of the content item. In another example, a user unliking a content item or hiding a content item indicates that the user has a negative sentiment for the topics of the content item. As another example, textual content posted by users to the social networking system 100 may be associated with negative connotations indicating a negative sentiment. The feedback module 155 may identify keywords in textual content such as "dislike," "hate," "sucks," etc. that are indicative of a general negative sentiment towards the topic of the content item. For example, a user may create a page in the social networking system 100 such as "I Hate School" which includes a keyword (e.g., "hate") associated with a negative sentiment which may be associated with a topic associated with the page.

User inaction with respect to content items in the social networking system 100 may also indicate a negative sentiment for the topics of the content item. That is, a lack of action by a user with respect to a content item may indicate that a user has a negative sentiment for the content item's associated topic. For example, a user may receive a content item (e.g., a post, an e-mail, or message) and the user's lack of response to the content item within a threshold amount of time may indicate a negative sentiment for the topic associated with the content item. The lack of response by the user may also indicate a negative sentiment of the user for the user sending the communication to the user, which may be used to modify presentation to the user of subsequent content items from the sending user.

Once the feedback module 155 identifies, from the action log 125, actions performed on a content item that indicate a negative sentiment, such as actions having a type that is associated with negative sentiment, the feedback module 155 identifies one or more features of the content item to associate with the negative sentiment. In one embodiment, the feedback module 155 retrieves one or more topics of the content item determined by the topic extraction engine 150 to associate with the negative sentiment. Hence, in one embodiment, the feedback module 155 identifies the topic of the content item as the feature causing, or otherwise associated with, the negative sentiment. In another embodiment, the feedback module 155 performs linear regression on various features extracted from a content item the features of the content to identify which features are associated with a negative sentiment by the user. The negative sentiment of a user for a content item may be stored and associated with the content item or with an action associated with the content item, or the negative sentiment between the user and a topic extracted from the content item is stored.

For example, a user performs an action to an advertisement that indicates a negative sentiment for the advertisement, such as closing or hiding the advertisement. The feedback module 155 extracts features from the advertisement and performs a linear regression on the extracted features. Examples of features extracted from the advertisement include a landing page for the advertisement, one or more topics associated with the advertisement, a page associated with the advertisement, a sender of the advertisement or other features. The feedback module 155 associates the user's negative sentiment with a feature (e.g., the topic) of the advertisement and stores the feature associated with the user's negative sentiment. In one embodiment, the feedback module 115 analyzes actions performed by the user on other objects within the social networking system 100 and features of the objects on which the user performed actions and analyzes the features of the objects on which the user acted to identify the feature of the advertisement to associate with negative sentiment. For example, the feedback module 155 performs a linear regression based on the features of objects on which the user performed an action to identify the advertisement feature associated with the negative sentiment.

The advertisement feature associated with the negative sentiment may be used to modify advertisements subsequently presented to the user. For example, the advertisement feature may be included in a negative interest profile for a user by the feedback module 155 so that subsequent advertisements having a feature included in the negative interest profile are not presented to the user. As another example, an advertisement's negative feature may be used when selecting subsequent advertisements; an expected value of a subsequent advertisement may be attenuated if the subsequent advertisement includes the identified negative feature or includes a similar negative feature.

In one embodiment, the negative sentiment associated with topics of advertisements may be provided to advertisers allowing adjustment of advertisement insights or metrics for distributing advertisements to users. In one embodiment, the feedback module 155 may provide negative sentiment (or positive sentiment) associated with topics to advertisers along with profile information of the users associated with the negative sentiment. The advertisers may then determine characteristics associated with the users that have the negative sentiment associated with a topic such as age range, gender, ethnicity, geographic location, religious beliefs etc. The characteristics may allow advertisers to more effectively target advertisements to users likely to be interested in the advertisement For example, the advertisers may determine that males ages 18 to 24 have a negative sentiment towards the topic of laundry detergent and may accordingly target users to exclude males from the age 18 to 24 from receiving laundry detergent advertisements.

In one embodiment, the feedback module 155 creates the negative interest profile for different users including topics for which the different users have indicated a negative sentiment. Topics associated with content items for which a user has a negative sentiment may be added to a user's negative interest profile as negative sentiments are identified. In one embodiment, the feedback module 155 adds a topic to the negative interest profile of a user in response to the user performing at least a threshold number of actions indicating a negative sentiment for a topic. This prevents the feedback module 155 from incorrectly assigning a negative sentiment to a topic.

The feedback module 155 may infer a negative sentiment of the user for additional topics based on topics included in the negative interest profile. That is, the feedback module 155 may infer a negative sentiment for an additional topic that is not included in the negative interest profile based on a relationship or similarity between the additional topic and one or more topics included in the blacklist. For example, if the negative interest profile for a user indicates a negative sentiment towards "cats", the feedback module 155 may infer a negative sentiment for topics related to "cats" such as "American Longhair cats," "cat food," or other topics related to, or associated with, "cats" that are not included in the negative interest profile. The topics for which a user's negative sentiment is inferred from topics in the negative interest profile may then be added to the negative interest profile.

The feedback module 155 enables modification of content items presented to a user to be modified based on the negative interest profile associated with the user. Candidate content items for the user are identified by the social networking system 100 and topics, or other features, associated with the candidate content items are compared to the negative interest profile associated with the user. The feedback module 155 removes from the candidate content items a subset of content items having one or more topics matching, or related to, topics included in the negative interest profile. For example, the negative interest profile of topics may include the topic of "cats," so the feedback module 155 removes content items associated with "cats" or related topics from the candidate content. In another embodiment, the feedback module 155 may refrain from selecting content items associated with topics included in the negative interest profile for the user as candidate content items. By providing content items to a user based on the negative sentiment of the user, the social networking system 100 increases the likelihood of providing content of interest to the user.

Providing Content to a User

Figure 2:
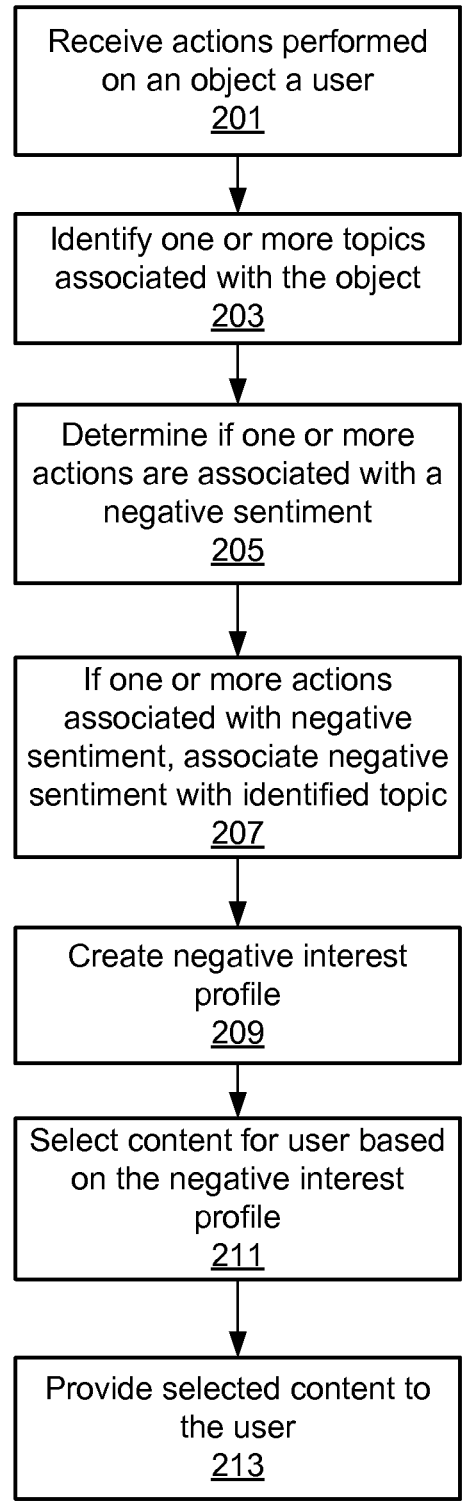
FIG. 2 illustrates a flow chart of a method for providing content to a user based on negative sentiments towards content items in the social networking system, in accordance with one embodiment.

FIG. 2 illustrates a method 200 of providing content to a user in a social networking system based on negative sentiments of the user. In other embodiments, different and/or additional steps than those shown in FIG. 2 may be performed.

The social networking system 100 receives 201 actions performed by a social networking system user on one or more objects maintained by the social networking system 100. The objects may be advertisements, posts, newsfeeds, timelines, or any other content item in the social networking system. Examples of actions include closing a content item, hiding a content item, unliking content, ignoring content, replying to content etc. For each object on which the user performs an action, the social networking system 100 identifies 203 a topic associated with the object. In one embodiment, a topic extraction engine 150 in the social networking system identifies 203 one or more topics associated with the object, as described above in conjunction with FIG. 1. While FIG. 2 describes an embodiment where one or more topics 203 associated with the object are identified 203, in other embodiments, the topic extraction engine 150 identifies 203 any suitable features associated with the object. For example, if the object is an advertisement, the topic extraction engine 150 may identify 203 one or more of a landing page associated with the advertisement, topics associated with the advertisement, an advertiser associated with the advertisement, keywords associated with the advertisement, a page associated with the advertisement or any other suitable features.

The feedback module 150 determines 205 if one or more of the actions performed on the object by the user are associated with a negative sentiment towards the topic of the object. For example, the feedback module 150 includes a listing of actions associated with negative sentiment by the social networking system 100 and determines 205 if one or more of the actions performed by the user are included in the listing. Examples of actions associated with negative sentiment include: a closing (i.e., dismissing) an object within a threshold amount of time from being presented the object, unliking an object, not sending a response to the object within a specified time interval, providing text input about the object that includes one or more words associated with negative sentiment or any other suitable action.

If one or more of the user's actions performed on the object are associated with a negative sentiment towards the topic of the object, the feedback module 150 infers that the user has a negative sentiment about the object. Alternatively, if it is unclear whether the user's action towards the object is indicative of negative sentiment for the topic, the feedback module 150 may infer negative sentiment based on interactions with other objects associated with the topic by other social networking system users having a known negative sentiment towards the topic, as described above.

In the embodiment shown by FIG. 2, the feedback module associates 207 this negative sentiment with one or more of the topics associated with the object. In other embodiments where the feature extraction module 150 identifies additional features associated with the object, the feedback module 150 associates 207 the negative sentiment with one of the identified features. For example, if at least one action performed by the user on the object is associated with negative sentiment, the feedback module 150 associates 207 the negative sentiment with the object. As another example, the feedback module 150 determines whether a number of actions performed by the user on the object indicate negative sentiment and associates 207 the negative sentiment with the object if the number of performed actions indicating negative sentiment equals or exceeds a threshold.

In one embodiment, the association between the negative sentiment and the topic associated with the object is used to create 209 a negative interest profile. The negative interest profile identifies topics, or other features, that are associated with a negative sentiment by the user. In one embodiment, the negative interest profile is used to select 211 additional content for the user that is subsequently presented 213 to the user. For example, the social networking system 100 compares one or more topics associated with the additional content to the negative interest profile and does not select 211 content for presentation to the user that is associated with at least one topic included in the negative interest profile. As another example, the social networking system 100 attenuates the expected value of an additional content item associated with a topic included in the negative interest profile and uses the expected values of different additional content items to select 211 the content item presented 213 to the user.

While the above description has been described with respect to inferring a user's negative sentiment for a topic based on the user's interaction with a content item and interactions by other social networking system users having a known negative sentiment for the topic with content items associated with the same topic, the preceding description may also be used to infer a user's positive sentiment for a topic using interactions by social networking system users having a known positive sentiment for a topic. Other types of sentiments may also be inferred using the above-described method. Furthermore, while the above description has been described with respect to inferring a user's negative sentiment for a topic based on the user's interaction with a content item and interactions by other users within the social networking context, the embodiments disclosed herein may be applicable to content items stored outside of the social networking system but associated with an object maintained by the social networking system.

SUMMARY

The foregoing description of the embodiments herein has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

The embodiments described herein may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments herein is intended to be illustrative, but not limiting, of the scope of the invention, which is set forth in the following claims.

What is claimed is:

1. A computer-implemented method comprising:
   storing, on a server, a user profile for a first user of a social networking system;
   receiving, by the server, one or more actions performed by the first user on a first object maintained by the social networking system;
   identifying, by multiple processors of the server, a topic associated with the first object, wherein the one or more actions performed by the first user on the first object subsequent to the first object being displayed to the first user indicate that the first user has a positive sentiment for the first object, but the one or more actions performed by the first user on the first object do not indicate whether the first user has a negative sentiment or a positive sentiment for the topic associated with the first object based on a context of use of the topic in the first object;
   retrieving, from the server, one or more actions previously performed by second users of the social networking system on one or more second objects that are also associated with the topic of the first object, the second users having user profiles indicating a negative sentiment for the topic associated with the first object that received the one or more actions by the first user subsequent to the first object being displayed to the first user that indicate the positive sentiment of the first user for the first object, the negative sentiment of the second users for the topic based on the one or more actions performed by the second users on the second objects;
   determining, by the multiple processors of the server, that the second users previously performed one or more actions on the first object that received the one or more actions by the first user subsequent to the first object being displayed to the first user that indicate the positive sentiment of the first user for the first object;
   inferring, by the multiple processors of the server, that the first user has a negative sentiment for the topic associated with the first object even though the one or more actions performed by the first user on the first object subsequent to the first object being displayed to the first user indicate that the first user has a positive sentiment for the first object, the inference based on the second users previously performing one or more actions on the first object that received the one or more actions by the first user, the second users previously performing one or more actions on the one or more second objects that are also associated with the topic of the first object, and the second users having user profiles indicating negative sentiment for the topic associated with the first object;
   storing, on the server, the topic as a negative interest in connection with the user profile; selecting, by the multiple processors of the server, content for presentation to the first user based at least in part of the negative interest;
   aggregating, by the multiple processors of the server, the selected content for presentation to the first user in a continuously updated real-time newsfeed;
   configuring, by the multiple processors of the server, the continuously updated real-time newsfeed into a format for presenting on a device of the first user; and
   presenting the configured continuously updated real-time newsfeed on the device of the first user.

2. The method of claim 1, wherein inferring that the first user has a negative sentiment for the topic comprises:
   inferring, by the multiple processors of the server, the first user has the negative sentiment for the topic responsive to determining that at least one of the actions performed by the first user matches an action previously performed on at least one of the second objects associated with the topic by at least one of the second users of the social networking system having a user profile indicating the negative sentiment for the topic associated with the first object.

3. The method of claim 1, wherein inferring that the first user has a negative sentiment for the topic comprises:
   inferring, by the multiple processors of the server, the first user has the negative sentiment for the topic responsive to determining that at least a threshold number of the actions performed by the first user match actions previously performed on one or more second objects associated with the topic by the second users of the social networking system having user profiles indicating the negative sentiment for the topic associated with the first object.

4. The method of claim 1, wherein the actions previously performed on one or more second objects associated with the topic by second users of the social networking system having user profiles indicating the negative sentiment for the topic associated with the first object comprise at least one selected from a group consisting of: closing a second object associated with the topic, hiding the second object associated with the topic, ignoring the second object associated with the topic, unliking the second object associated with the topic, not sending a response to the second object associated with the topic within a specified time interval and providing text input about the second object associated with the topic that includes one or more words associated with negative sentiment.

5. The method of claim 1, further comprising:
   identifying, by the multiple processors of the server, one or more third objects on which the first user performed one or more actions, the one or more third objects associated with one or more topics matching the one or more topics associated with the first object; and
   associating, by the multiple processors of the server, the negative sentiment with the one or more third objects based on the actions performed on the one or more third objects.

6. The method of claim 1, wherein the first object comprises at least one selected from the group consisting of: advertisements, posts, videos, images, stories, events and groups.

7. A computer-implemented method comprising:
   receiving, by a server, actions performed on objects by a user of a social networking system that indicate a negative sentiment towards the objects, each of the objects associated with a plurality of topics;
   identifying, by multiple processors of the server, a topic from the plurality of topics that is common to all of the objects;
   determining, by the multiple processors of the server, a total number of actions performed on the objects by the user that indicate the negative sentiment towards the objects;
   responsive to the total number of actions associated with negative sentiment equaling or exceeding a threshold, associating, by the multiple processors of the server, the negative sentiment with the topic common to all of the objects;

selecting, by the multiple processors of the server, content for presentation to the user who performed the actions based on the negative sentiment for the topic aggregating, by the multiple processors of the server, the selected content for presentation to the user in a continuously updated real-time newsfeed;

configuring, by the multiple processors of the server, the continuously updated real-time newsfeed into a format for presenting on a device of the user; and presenting the configured continuously updated real-time newsfeed on the device of the user.

8. The method of claim 7, wherein identifying a negative sentiment for the objects based on the actions on the objects comprises:

determining, by the multiple processors of the server, whether one or more actions performed on an object are actions associated with negative sentiment by the social networking system; and responsive to determining at least one action performed on the object is an action associated with the negative sentiment by the social networking system, identifying, by the multiple processors of the server, the negative sentiment for the object upon which the at least one action was performed.

9. The method of claim 7, wherein an action associated with negative sentiment by the social networking system comprises an action performed on an additional topic associated with the topic by one or more additional users associated with negative sentiment for the topic by the social networking system.

10. The method of claim 8, wherein the actions associated with negative sentiment by the social networking system comprise at least one selected from a group consisting of: closing the object, hiding the object, ignoring the object, unliking the object, not sending a response to the object within a specified time interval and providing text input about the object that includes one or more words associated with negative sentiment.

11. The method of claim 7, wherein the actions associated with negative sentiment by the social networking system comprise at least one selected from a group consisting of: closing the object, hiding the object, ignoring the object, unliking the object, not sending a response to the object within a specified time interval and providing text input about the object that includes one or more words associated with negative sentiment.

12. The method of claim 7, wherein an action associated with negative sentiment by the social networking system comprises an action performed on an additional topic associated with the topic by one or more additional users associated with negative sentiment for the topic by the social networking system.

13. The method of claim 7, wherein selecting content for presentation to the user based on the association between the negative sentiment for the one or more topics comprises:

creating, by the multiple processors of the server, a blacklist associated with the user, the blacklist including the topic associated with the negative sentiment; and selecting, by the multiple processors of the server, the content to provide to the user so a topic associated with the content is not included on the blacklist based on the blacklist of topics.

14. The method of claim 7, further comprising:

identifying, by the multiple processors of the server, one or more additional topics related to the topic associated with the negative sentiment; and associating, by the multiple processors of the server, the negative sentiment with the one or more additional topics.

15. The method of claim 7, wherein objects comprise one or more of: advertisements, posts, videos, images, stories, events and groups.

16. The method of claim 7, wherein the content provided to the user is at least one selected from a group consisting of: an advertisement, a video, an image, a story, or a link.

17. A computer-implemented method comprising: storing, on a server, a user profile for a user of a social networking system;

receiving, by the server, an action by the user performed on an advertisement subsequent to the advertisement being presented to the user, the action associated with a positive sentiment towards the advertisement by the social networking system;

extracting, by multiple processors of the server, an advertisement feature from the advertisement;

identifying, by the multiple processors of the server, that the action performed by the user on the advertisement subsequent to the advertisement being presented to the user does not indicate whether the user has a positive sentiment or a negative sentiment towards the advertisement feature based on a context of use of the advertisement feature in the advertisement;

retrieving, by the multiple processors of the server, actions performed by the user on a plurality of additional objects maintained by the social networking system, the actions on the plurality of additional objects subsequent to the plurality of additional objects being presented to the user and indicative of negative sentiment associated with the additional objects;

extracting, by the multiple processors of the server, features from the plurality of additional objects;

identifying, by the multiple processors of the server, one or more of the plurality of additional objects that include an advertisement feature that matches the advertisement feature extracted from the advertisement;

associating, by the multiple processors of the server, the advertisement feature extracted from the advertisement with a negative sentiment based on the actions performed by the user on the plurality of additional objects subsequent to the plurality of additional objects being presented to the user indicating a negative sentiment for the features of the identified additional objects that match the advertisement feature extracted from the advertisement;

storing, on the server on the user profile, an association between the selected advertisement feature and the negative sentiment in the user profile;

selecting, by the multiple processors of the server, an additional advertisement for presentation to the user based on the selected advertisement feature associated with the negative sentiment; and aggregating, by the multiple processors of the server, content for presentation to the user in a continuously updated real-time newsfeed, the content including the selected advertisement;

configuring, by the multiple processors of the server, the continuously updated real-time newsfeed into a format for presenting on a device of the user; and presenting the configured continuously updated real-time newsfeed on the device of the user.

18. The method of claim 17, wherein the action associated with the negative sentiment by the social networking system comprise at least one selected from a group consisting of: closing the object, hiding the object, ignoring the object, unliking the object, not sending a response to the object within a specified time interval and providing text input about the object that includes one or more words associated with negative sentiment.

19. The method of claim 18, wherein selecting, based on the selected advertisement feature associated with the negative sentiment, the additional advertisement for presentation to the user comprises:

selecting, by the multiple processors of the server, an advertisement that does not include an advertisement feature that does not match the advertisement feature associated with the negative sentiment.

20. The method of claim 18, wherein selecting, based on the selected advertisement feature associated with the negative sentiment, the additional advertisement for presentation to the user comprises:

calculating, by the multiple processors of the server, an expected value associated with each of a plurality of candidate advertisements;

reducing, by the multiple processors of the server, an expected value associated with a candidate advertisement including an advertisement feature matching the advertisement feature associated with the negative sentiment; and selecting, by the multiple processors of the server, the additional advertisement from the plurality of candidate advertisements based on the calculated expected values.

21. The method of claim 18, wherein the one or more advertisement features are selected from a group consisting of: a landing page for the advertisement, one or more topics associated with the advertisement, a page associated with the advertisement and a sender of the advertisement.

22. The method of claim 17, wherein the action associated with the negative sentiment is based on another action performed on an additional advertisement having one or more advertisement features matching at least one of the one or more advertisement features extracted from the advertisement.

* * * * *

UNITED STATES PATENT AND TRADEMARK OFFICE
CERTIFICATE OF CORRECTION

PATENT NO. : 10,380,606 B2
APPLICATION NO. : 13/566016
DATED : August 13, 2019
INVENTOR(S) : Antonio Felipe Garcia-Martinez It is certified that error appears in the above-identified patent and that said Letters Patent is hereby corrected as shown below:

In the Claims

Column 15, Lines 56-59, Claim 1, delete "selecting, by the multiple processors of the server, content for presentation to the first user based at least in part of the negative interest" and insert at Column 15, Line 57 -- selecting, by the multiple processors of the server, content for presentation to the first user based at least in part of the negative interest --

Column 17, Line 3, Claim 7, insert -- ; -- after "topic"

Column 19, Line 1, Claim 18, delete "comprise" and insert -- comprises --

Signed and Sealed this
Tenth Day of December, 2019

Andrei Iancu
*Director of the United States Patent and Trademark Office*